Sept. 22, 1953     I. J. PICKERING     2,653,277
WELDING APPARATUS AND WELDING SYSTEM
Filed Oct. 5, 1951     4 Sheets-Sheet 1

FIG. I

INVENTOR
Ian Jack Pickering
BY
ATTORNEY

Sept. 22, 1953     I. J. PICKERING     2,653,277
WELDING APPARATUS AND WELDING SYSTEM
Filed Oct. 5, 1951     4 Sheets-Sheet 3
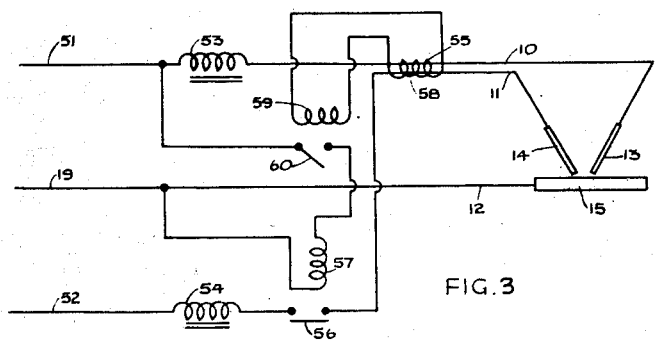
FIG. 3
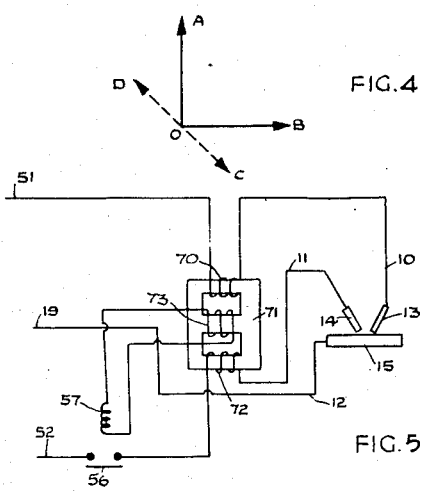
FIG. 4
FIG. 5
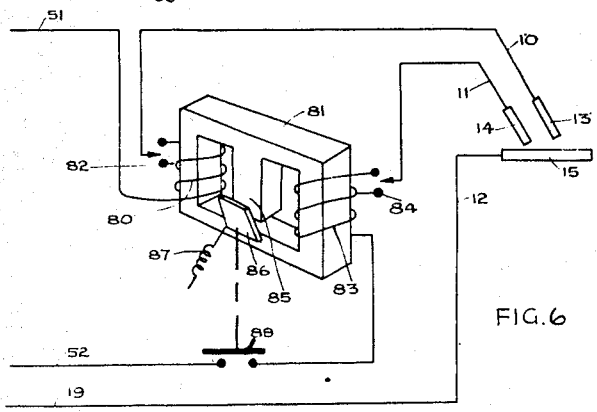
FIG. 6
INVENTOR
IAN JACK PICKERING
BY
ATTORNEY Sept. 22, 1953    I. J. PICKERING    2,653,277
WELDING APPARATUS AND WELDING SYSTEM
Filed Oct. 5, 1951    4 Sheets-Sheet 4

INVENTOR
Ian Jack Pickering
BY
ATTORNEY

Patented Sept. 22, 1953

2,653,277

UNITED STATES PATENT OFFICE 2,653,277

WELDING APPARATUS AND WELDING SYSTEM

Ian Jack Pickering, Birmingham, England, assignor to The General Electric Company Limited, London, England Application October 5, 1951, Serial No. 249,902
In Great Britain April 26, 1950

10 Claims. (Cl. 315—139)

The present invention relates to welding apparatus and to welding systems employing a two-phase welding current supply and is applicable, for example, to such systems in which the two-phase welding current supply is obtained from a Scott-connected transformer set, though it is also applicable to systems in which the two-phase welding current is obtained from other arrangements.

Where a two-phase supply has been employed for electric arc welding it has been found convenient to secure together the two welding electrodes so that they form a single mechanical structure, but are, of course, insulated from one another electrically. The mechanical bonding of the two electrodes together can be effected, for example, but the use of the flux composition which normally surrounds the welding electrodes. It has been found with such arrangements that when the welding is stopped by removing the electrodes from the welding position in relation to the work, an arc persists between the two electrodes. It has been proposed to extinguish this arc by providing a switch for cutting off the welding current. If this switch is arranged in the electrode holder there is a tendency for the holder to become unduly bulky and heavy so that manual welding is rendered more difficult. As an alternative a foot operated switch may be arranged in the main cables between the welding transformer and the electrode holder. A further alternative consists in providing a contactor operated switch arranged either in the primary or the secondary winding of the welding transformer, the operator being provided with means for operating the contactor when desired. All these arrangements suffer from a disadvantage in that it is necessary for the operator to perform an operation to switch off the welding current when he wishes to stop welding.

According to one aspect of the present invention apparatus for two-phase arc welding in which two welding electrodes are to be used simultaneously and in close proximity, said electrodes and the work to be welded being arranged to be connected to two phases and the neutral or common return line of a two-phase welding supply, is provided with automatic means for reducing the voltage between the electrodes to a value at which the inter-electrode arc is extinguished when the current or voltage conditions which obtain during welding operations are altered as, for instance, when the arcs between the electrodes and the work are extinguished.

According to another aspect of the present invention control apparatus for a two-phase arc welding system in which two welding electrodes are arranged to be used simultaneously and in close proximity, said electrodes and the work being connected to two phases and the neutral or common return line of a two-phase welding supply, comprises automatic means for reducing the voltage between the electrodes to a value such that the inter-electrode arc is extinguished when the current or voltage conditions which obtain during welding operations are altered as, for instance, when the welding arcs between the electrodes and the work are extinguished.

In one arrangement in accordance with the present invention, the automatic means for reducing the voltage between the electrodes is responsive to the current flowing in the neutral or common return line of the welding current supply. The means responsive to the current flowing in the neutral line may include a saturable current transformer having a winding connected in the neutral line and arranged to feed the operating winding of a relay or contactor for effecting switching for interrupting any arc which may persist between the two electrodes. The switching operation may be effected in the welding circuit or alternatively, if desired, it may be effected in the primary winding of a transformer having a secondary winding which is arranged to provide the welding current supply.

In addition to the means responsive to the current in the neutral or common return line of the welding supply, further means responsive to the decrease in the voltage between one or each of the welding lines and the common return line may be arranged to perform a switching operation to re-establish the normal welding conditions when one or both of the electrodes is brought into contact with the work so as to complete the welding circuit or circuits. This operation may be effected by means of a relay responsive to the voltage between one of the welding lines and the common earth return line, this relay being arranged when the voltage drops to a low value to effect a switching operation to re-establish the normal welding conditions.

As an alternative of the arrangement above described, the automatic means for performing a switching operation to reduce the voltage between the electrodes may be actuated by means responsive to the sense of current flow in the two phase lines of the supply. For example, a transformer may have two windings on a common core, each of said windings being connected in series with one of the welding electrodes so that the flow of welding current causes magnetisation of the core of the transformer. The two windings of the transformer may be arranged to act as current regulating chokes.

In a further alternative arrangement in which the switching operation is effected in response to the sense of current flow in the two phase lines of the supply, two windings on a common core of a transformer may be connected in the two phase lines respectively and the magnetic flux in the core of the transformer may be arranged to complete the normal welding circuit when the magnetic flux is unbalanced, by providing an armature, which is arranged to be attracted towards the core of the transformer under such conditions, but to move away from the core when the magnetic fluxes due to the two windings connected to the two phase lines balance. A feature of this invention consists in using the regulating chokes provided in the welding circuit as the transformer aforementioned, the two chokes for the two lines to the welding electrodes being wound on a common core having three limbs, the windings being wound on two of the limbs and the armature being arranged in association with the third limb of the transformer.

In a further alternative arrangement in accordance wtih the present invention the automatic means for reducing the voltage between the two electrodes is arranged to be responsive to the voltage existing between one of the two phase lines and the neutral or common return line or alternatively to be responsive to a comparison of the voltages between each of the lines and the neutral or common return line. It can be shown that owing to the presence of the current regulating chokes in the two phase lines the voltages between the phase lines and the neutral become unequal when the main welding arcs between the electrodes connected to the phase lines and the work connected to the neutral are broken. This change of voltage or the inequality of the two voltages can be arranged to operate voltage responsive means to reduce the voltage between the electrodes. Where means responsive to the voltage between one line and the neutral is employed it is preferably connected to the line in which the change of voltage-to-neutral is greater, this being dependent upon the sense of phase rotation of the welding current supply.

In the arrangements above described the reduction of the voltage between the electrodes, in response to the change in the current or voltage conditions which occurs when the arcs between the electrodes and the work are extinguished, has been effected by means responsive to the current balance or voltage conditions in the welding circuit but, in accordance with the present invention, such control may alternatively be effected in response to the change of conditions in the primary windings of the welding transformer. For instance, when the two-phase welding supply is derived through a Scott-connected transformer from a three-phase alternating current supply the control may be effected in response to the unbalancing of the primary currents in the three phases of the supply to the primary windings of the welding transformer which occurs when the welding arcs between the electrodes and the work are extinguished leaving only the persistent arc between the two electrodes. This off balance of the primary currents may be detected by means of a core balance transformer or a bridge network or by balanced relays energised by the current flowing in any two of the three-phase alternating current supply lines.

Seven arrangements of apparatus in accordance with the present invention will now be described by way of example with reference to the accompanying drawings in which:

Figure 1 shows an arrangement in which control is effected in response to the current in the neutral or common return lead of the welding supply. Figure 2 shows a modification.

Figure 3 shows an arrangement in which control is effected in response to the phase relationship of the currents in the two phase lines feeding current to the electrodes, and Figure 4 is a vector diagram showing in full lines the phase relationship of the currents fed to the welding electrodes during welding and in dotted lines the phase relationship of the currents fed to the electrodes when the welding arcs between the electrodes and the work are broken.

Figure 5 shows an alternative arrangement in which the currents are fed to the electrodes through two windings disposed on separate limbs of a transformer having three limbs, the third limb carrying a winding by which a contactor is energised during welding.

Figure 6 shows a further alternative arrangement in which the currents are fed to the electrodes through two windings of a double-wound choke having high leakage inductance the windings being tapped so that they may be used for regulating the welding current. The magnetic flux in the third limb of the transformer is arranged to attract an armature to actuate a switch for controlling the supply of welding current to one of the electrodes.

Figure 1:
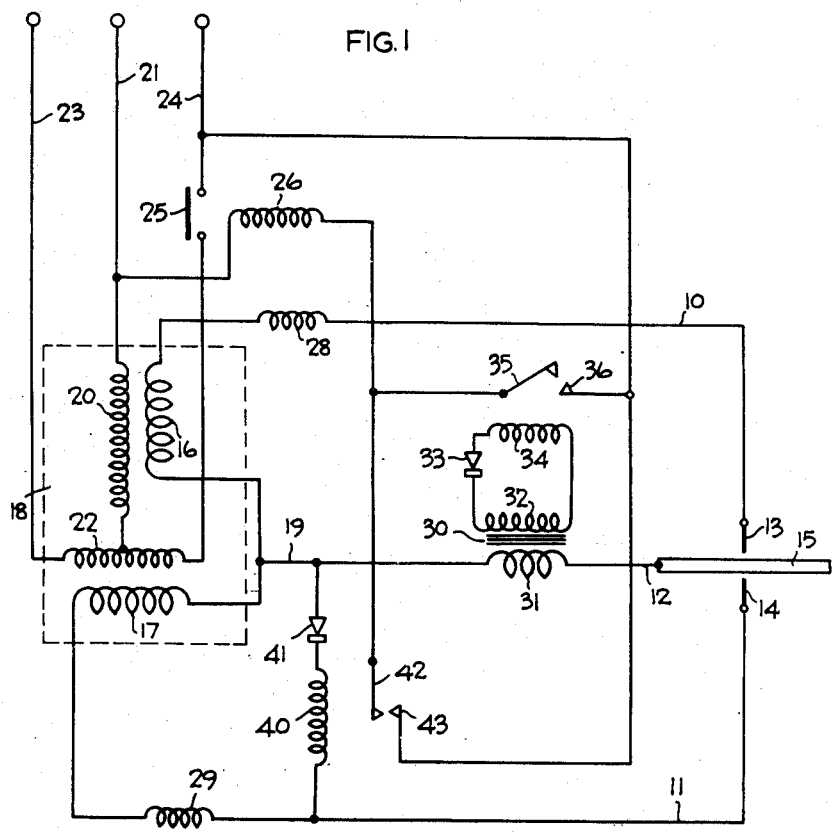

Referring to Figure 1: a two-phase supply welding current is fed to two leads 10 and 11 respectively and a neutral lead 12. The leads 10 and 11 are connected to electrodes 13 and 14 respectively, while the work 15 which is to be welded is connected to the neutral lead 12. The two-phase welding current supply is obtained from the secondary windings 16 and 17 of a Scott-connected transformer indicated at 18. The transformer 18 has a primary winding 20, one end of which is connected to one three-phase line 21 while the other end is connected to the centre point of a second primary winding 22, the ends of which are connected to the two other three-phase lines 23 and 24 respectively. The connection to the line 24 is made through a contactor 25 which is closed when its operating coil 26 is energised.

As above mentioned, an end of each secondary winding 16 and 17 of the transformer 18 is connected to the leads 10 and 11 respectively. The other ends of the secondary winding 16 and 17 are connected together to a lead 19 which is connected to the neutral lead 12 through a saturable current transformer 30 having a primary winding 31 arranged to carry the current in the neutral lead 12 and having a secondary winding 32 which feeds through a rectifier 33 the operating winding 34 of a current relay having contacts 35 and 36 which are bridged when the operating winding 34 is energised. The contacts 35 and 36 are connected in a circuit for energising the operating winding 26 of the line contactor from the lines 21 and 24. The operating winding 40 of a voltage relay is connected in series with a rectifier 41 between the lead 19 and the lead 11. The voltage relay has contacts 42 and 43 which are connected in parallel with the contacts 35 and 36 of the current relay.

The arrangement is such that while welding current flows in the neutral lead 12 the line contactor connecting the line 24 through the contacts 25 to the primary winding 22 of the transformer 18 is maintained closed but when the current in the neutral lead 12 ceases when the welding electrodes are removed from the work, the cessation of the current through the primary winding of the saturable current transformer de-energises the operating winding 34 of the current relay and so de-energises the operating winding 26 of the line contactor thereby cutting off the supply from the line 24 to the primary winding 22 of the transformer 18.

The function of the voltage relay is to respond to a drop in the voltage between the leads 11 and 19 such as occurs when the electrode 14 is touched on the work 15 in order to re-establish welding conditions. The reduction in voltage partially de-energises the operating winding 40 allowing the contacts 42 and 43 to close thereby energising the operating winding 26 of the line contactor so as to complete the three-phase connections to the primary windings of the transformer 18. The completion of these connections to the primary windings of the transformer re-establishes the supply of welding current to the leads 10 and 11 and the neutral lead 12 so that current again flows in the primary winding 31 of the saturable current transformer which results in energisation of the operating winding 34 of the current relay causing contacts 35 and 36 to close so as to maintain the energisation of the operating winding 26 of the line contactor even when the voltage between the leads 11 and 19 rises during welding to a value which causes the contacts 42 and 43 to separate.

Figure 2:
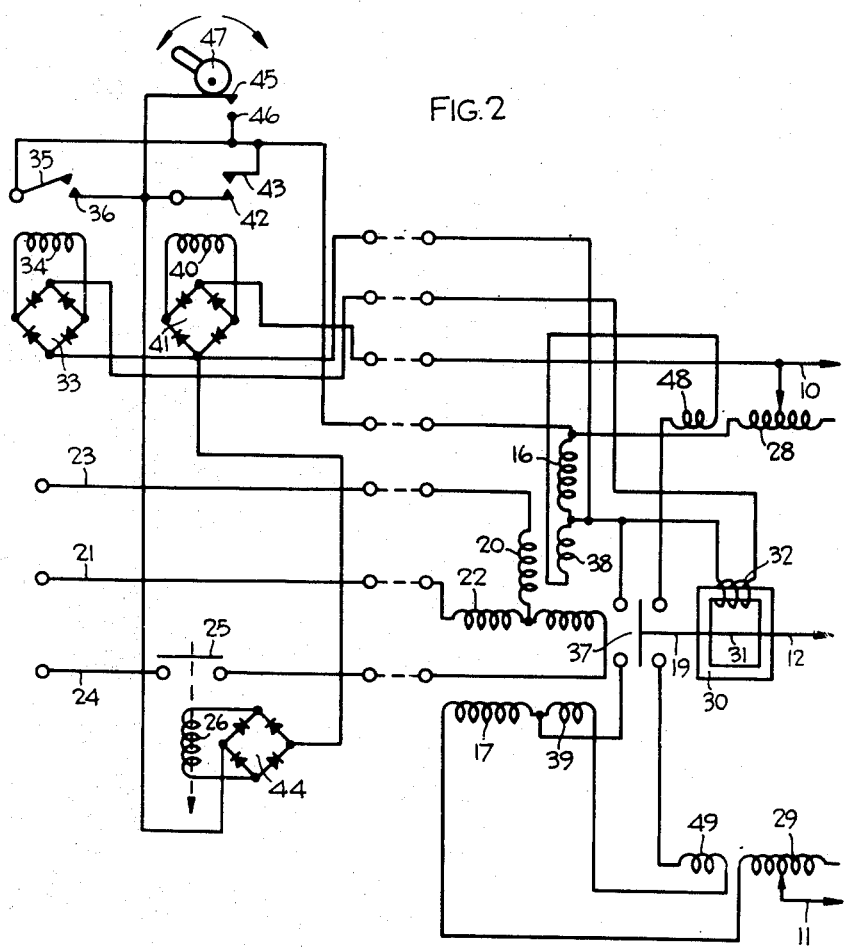

An alternative arrangement which in many respects is similar to that already described is shown in Figure 2 of the accompanying drawings. The same reference numerals will be used to indicate corresponding parts in the two arrangements. In the arrangement shown in Figure 2, the secondary windings of the Scott-connected transformer are provided with tappings so as to enable the welding voltage to be altered and a changeover switch generally indicated at 37 is provided for this purpose. When the switch 37 is in the left-hand position only the portions 16 and 17 of the secondary windings are used and these are connected together and through the lead 19 and the winding 31 of the saturable current transformer 30 to the lead 12 connected to the work. When the changeover switch 37 is in its right-hand position, additional windings 38 and 39 which constitute continuations of the secondary windings 16 and 17 respectively are brought into circuit. These are arranged to be connected through additional sections 48 and 49 of the current regulating chokes 28 and 29 to the common return lead 19 which is connected through the winding 31 of the saturable current transformer 30 to the lead 12 connected to the work.

As in the arrangement shown in Figure 1, the operating winding 34 of the current responsive relay having normally open contacts 35 and 36 is arranged to be fed from the secondary winding 32 of the saturable current transformer 30. The rectifier 33 in this circuit is shown as being a bridge connected rectifier. The connections of the voltage responsive relay having the operating winding 40 are similar to those shown in Figure 1 except that this relay is connected between the lead 10 connected to the welding electrode 13 and the junction of the secondary winding 16 and 38. The rectifier 41 through which the operating coil 40 is fed is of the bridge connected type.

The arrangement of the connections for feeding the operating winding 26 of the contactor having contacts 25 controlling the supply of current to the centre tapped winding 22 of the Scott-connected transformer is somewhat different from that shown in Figure 1. The operating winding 26 is fed through a bridge connected rectifier 44, one alternating current terminal of which is connected to the junction of the secondary windings 16 and 38 while the other alternating current terminal of the rectifier 44 can be connected through three alternative pairs of contacts to the end of the secondary winding 16 which is connected to the current regulating choke 28. The three alternative pairs of contacts are the normally open contacts 35 and 36 of the current responsive relay, the normally closed contacts 42 and 43 of the voltage responsive relay, and a further pair of contacts 45 and 46 which can be closed by a manually operable cam 47. When the cam 47 is in the position in which the contacts 45 and 46 are open, the apparatus is arranged for two-phase welding using the control arrangements which operate generally in the manner above described with reference to Figure 1. If, however, the contacts 45 and 46 are closed by the cam 47, the control arrangements are rendered inoperative and either the electrode 13 or the electrode 14 or each of these electrodes can be used for single-phase welding, the work in each case being connected to the neutral or common return lead 12.

Referring to Figures 3 and 4; the electrodes 13 and 14 are fed from two-phase welding current supply lines 51 and 52 through current regulating chokes 53 and 54 and also through a double current transformer 55. The work 15 is connected to the common return or neutral lead 12. A normally open contactor 56 having an actuating coil 57 is arranged to interrupt the supply of current to the electrode 14 when the operating winding 57 is deenergized. The double current transformer 55 has two windings which carry the current fed to the leads 10 and 11 connected to the electrodes 13 and 14 respectively. These windings are magnetically coupled to a third winding 58 connected to the operating winding 59 of a relay 60 which has normally open contacts.

Under welding conditions the vector relationship of the currents fed to the electrodes 13 and 14 is generally as shown in full lines in Figure 4, the vector OA representing the current fed to the electrode 13 being generally at right angles to the vector OB representing the current fed to the electrode 14. Under these conditions the return current to the neutral line 19 of the two-phase welding supply flows from the electrodes 13 and 14 to the work 15 and thence through the neutral or common return lead 12. The two-phase currents represented by the vectors OA and OB cause a voltage to be induced in the winding 55 of the double current transformer 55 so that the operating winding 59 of the relay 60 is energised to close the circuit to connect the operating winding 57 of the contactor across the lines 51 and 19 of the welding supply. This holds contacts 56 closed so that the two-phase welding current is fed to the electrodes 13 and 14.

When the welding arcs between the electrodes 13 and 14 and the work 15 are broken, for instance by moving electrodes 13 and 14 away from the work, only the inter-electrode arc between the electrodes 13 and 14 persists. Under these conditions a single phase current flows from one electrode to the other so that, as shown in dotted lines in Figure 4, the two current vectors OC and OD, representing the currents in the leads 10 and 11 respectively, are opposed to one another so that no voltage is induced in the winding 58 of the double current transformer 55 so that the relay 60 is de-energised thereby de-energising the operating winding 57 of the contactor having the contacts 56 through which welding current is fed to the electrode 14. The opening of the contactor breaks the circuit from the welding supply through the electrodes and thereby breaks the inter-electrode arc. The welding conditions can be re-established by touching the electrode 13 on the work 15 so that current flows in the lead 10 and thereby induces a voltage in the third winding 58 of the double current transformer so as to energise in turn the relay 60 and the contactor having contacts 56 through which current is fed to the electrode 14 from the other phase line 52 of the welding current supply.

The operation of the alternative arrangement shown in Figure 5 is somewhat similar to that shown in Figure 3. Current from one phase 51 of the welding current supply is fed to the electrode 13 through one winding 70 of a transformer having a three limbed core 71. Current is fed from the other phase line 52 of the welding current supply through the contacts 56 of a normally open contactor and a second winding 72 on a separate limb of the core 71 of the transformer. A third winding 73 on the central limb of the core 71 is connected to the operating winding 57 of the contactor having the contacts 56.

During welding the vector relationship between the currents in the windings 70 and 72 is generally as indicated by the vectors OA and OB respectively in Figure 4. This out-of-phase relationship between the currents causes a voltage to be induced in the winding 73 which is sufficient to maintain the contactor closed so that the electrode 14 is connected to the second phase line 52 of the welding current supply. When the welding arcs between the electrodes 13 and 14 and the work 15 are broken, a single phase current flows through the windings 70 and 72 and through the leads 10 and 11 and electrodes 13 and 14. Under these conditions the magnetic fluxes induced in the core 71 substantially balance so that no voltage is induced in the winding 73, and the contacts 56 of the contactor open and disconnect the electrode 14 from the welding current supply. The welding conditions can be re-established by touching the electrode 13 on the work 15 so that a voltage is induced in the winding 73 to energise the operating winding 57 of the contactor and thereby close the contacts 56 to complete the two-phase welding circuits.

In the arrangement shown in Figure 6, welding current from the supply line 51 is fed to the lead 10 and thence to the electrode 13 through a winding 80 on one end limb of a three limbed core 81. The winding 80 has a tapping 82 or a plurality of tappings so that either the whole or a part of the winding 80 may be arranged in circuit. In this way the winding 80 can be arranged to operate as a current regulating choke for adjusting the magnitude of the welding current fed to the electrode 13. The other electrode 14 is similarly fed through a second winding 83 on the other end limb of the core 81, this second winding 83 also being provided with a tapping 84 or tappings for the purpose above mentioned. An armature 86 is pivotally mounted in association with a gap between the central limb 85 and the yoke of the core 81 so that when magnetic flux flows through the central limb 85 the armature 86 is attracted towards the core. Such movement of the armature 86 is resisted by a spring 87, the other end of which is connected to a fixed or adjustable support (not shown). The armature 86 is mechanically coupled to switch contacts 88 which are arranged in the circuit from the supply line 52 to the electrode 14. The magnetic flux produced in the central limb of the core 81 is arranged to be greater under the welding conditions than when the inter-electrode arc alone exists. The switch contacts 88 are of the normally open type so that they are closed to maintain the supply of welding current to the welding electrode 14 during welding.

The arrangements as above described are applicable to welding circuits in which a single welding transformer or generator is arranged to supply welding current to two or more operators simultaneously. In such an arrangement each operator may have individual current regulating chokes and be provided with an individual transformer having windings carrying the current fed to his two electrodes. Unbalanced currents in the transformer may be arranged to maintain a contactor in one of the two phase lines closed. The operation of this contactor will be independent of the operation of other contactors in the lines supplying other welding operators. This arrangement will ensure that the arc persisting between the two electrodes when they are removed from proximity with the work will be extinguished and automatic reconnection when welding is resumed.

Figure 7:
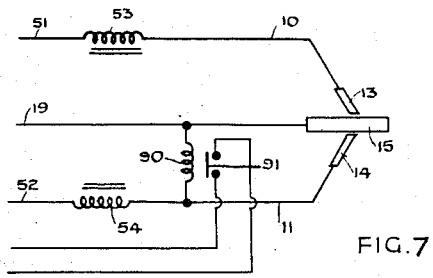
Figure 7 shows another alternative arrangement in which the change of voltage between one of the electrodes and the work as a result of a change from the welding condition to the condition in which only an inter-electrode arc persists between the two electrodes is used to control the welding current.

In the arrangement shown in Figure 7, the change in the voltage between one of the welding electrodes and the neutral line as between the welding condition and the condition in which an inter-electrode arc persists between the electrodes 13 and 14 is arranged to effect the automatic control of the supply of welding current. In this arrangement the welding electrode 13 is fed from one line 51 of the two-phase welding current supply through a current regulating choke 53. The other electrode 14 is similarly fed from the other phase line 52 through a current regulating choke 54. The operating winding 90 of a voltage responsive relay having contacts 91 is connected between the neutral or common return line 19 and the lead 11 supplying welding current to the electrode 14.

Figures 8, 9:
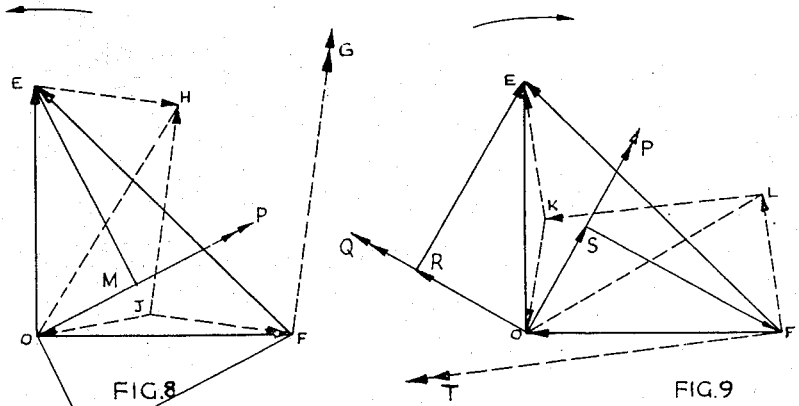
Figure 8 is a vector diagram for the arrangement shown in Figure 7 with one direction of phase rotation and Figure 9 is a vector diagram with the opposite phase rotation. In the vector diagrams the full lines indicate the voltage vectors during welding and the dotted lines the vectors when the arcs between the electrodes and the work are broken.

The operation of the apparatus shown in Figure 7 will be more clearly understood by reference to the Figures 8 and 9 in which the full lines represent the vector relationship of the voltages under welding conditions. In Figure 8, the vector OE represents the voltage between the neutral line 19 and the line 51 while the vector OF represents the voltage between the line 19 and the line 52. These are the line voltages of the two-phase welding current supply and are assumed to remain substantially constant. During welding the current in the line 51 and the lead 10 to the electrode 13 is represented by the vector OP. The vector OM in phase with the current vector OP represents the voltage between the line 19 and the lead 10 while the voltage across the regulating choke 53 is represented by the vector EM. Similarly, the vector OQ represents the current in the line 52 and the lead 11 and the vector ON the voltage between the line 19 and the lead 11 and the vector FN the voltage drop across the regulating choke 54. When the main welding arcs between the electrodes 13 and 14 and the work 15 are broken the vector relationship is altered and the vector FG represents the single-phase current while the vector EF represents the voltage between the lines 52 and 53. There is a voltage drop in the regulating choke 53 represented by the vector EH and a voltage drop in the regulating choke 54 represented by the vector FJ. The vector HJ represents the inter-electrode voltage. The voltage between the electrode 13 and the neutral or common return line 19 is represented by the vector OH while the voltage between the electrode 14 and the neutral line 19 is represented by the vector JO. It will be seen that the magnitude of the voltage between the neutral line 19 and the electrode 14 represented by the vector HO is substantially greater in the single-phase condition than the vector ON which represents the voltage between these points during welding.

Figure 9 is a vector diagram similar to Figure 8 except that the direction of phase rotation has been reversed. During normal welding conditions the current in line 51 and lead 10 is represented by the vector OQ and the voltage between the line 19 and the lead 11 by the vector OR, the voltage drop across the regulating choke 53 being represented by the vector ER. The current in the line 52 and lead 51 is represented by the vector OP, the voltage between the line 19 and the lead 11 being represented by the vector OS and the voltage drop across the regulating choke 54 by the vector FS. When the main welding arcs between the electrodes 13 and 14 respectively and the work 15 are broken, the vector relationship changes to that shown in dotted lines. The vector FT represents the single-phase current and the vectors EK and FL the voltage drops across the regulating chokes 53 and 54 respectively while the vector KL represents the inter-electrode voltage. The voltage between the neutral line 19 and the line 10 is represented by the vector KO while the voltage between the line 19 and the lead 11 is represented by the vector OL. It will be seen that the vector OL is substantially greater than the vector OS which represents the voltage between the same points during normal welding.

With the sense of phase rotation shown in Figure 8 the operating winding 90 of the voltage sensitive relay having the normally closed contacts 91 would be connected between the neutral or common return line 19 and the lead 10 because there is a greater change of voltage between the welding condition and the condition in which only the inter-electrode arc exists. With the sense of phase rotation shown in Figure 9, however, the operating winding 90 of the voltage sensitive relay should be connected between the neutral or common return line 19 and the lead 11 as shown in Figure 7. During welding the voltage applied to the operating winding 90 of the voltage sensitive relay is insufficient to energise the relay so that the normally closed contacts 91 remain closed. On removing the electrodes 13 and 14 so that the welding arcs between them and the work 15 are broken the voltage across the operating winding 90 increases thus causing the contacts 91 to open. The opening of these contacts is arranged to effect a switching operation to reduce the inter-electrode voltage to a value insufficient to maintain the inter-electrode arc. Preferably, where the welding current supply is obtained from a Scott-connected transformer the opening of the contacts 91 is arranged to open circuit one primary line of the transformer so as to extinguish the inter-electrode arc but leaving a voltage across the operating winding 90 of the voltage sensitive relay greater than the voltage existing across it during normal welding. On re-striking the welding arcs by bringing the electrode to which the operating winding 90 is connected into contact with the work the voltage across the operating winding 90 is reduced to zero or nearly to zero allowing the contacts 91 to close thereby restoring the three-phase transformer connections. The voltage which exists during normal welding across the operating winding 90 is insufficient to cause the contacts 91 to open.

Figure 10:
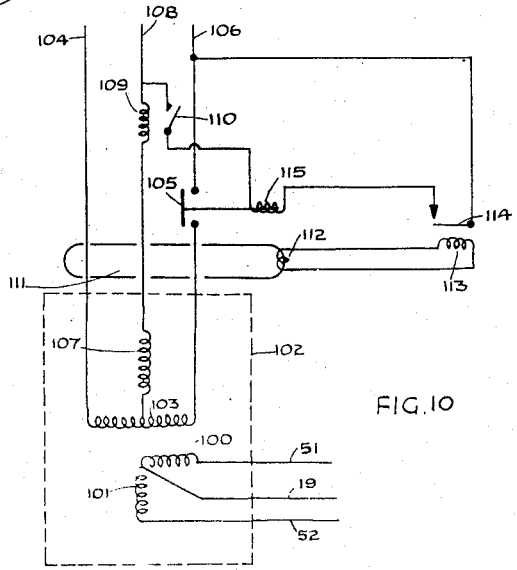
Figure 10 shows a further alternative arrangement in which a current balance transformer is associated with the primary winding of a Scott-connected welding transformer of which only the primary connections are shown.

In the arrangement shown in Figure 10, the control means, instead of being responsive to the current or voltage obtaining in the welding circuit which may, for example, be the circuit connected to the secondary windings of a welding transformer, the central means are arranged to respond to the unbalancing of the currents in the primary winding of a welding transformer which may, for instance, be of the Scott-connected type or some other type having balanced primary currents from the three phases of a three-phase alternating current supply. In the arrangement shown in Figure 10, a Scott-connected transformer is used, the two-phase welding current supply fed to the two phase lines 51 and 52 and the neutral or common return line 19 being obtained from the secondary windings 100 and 101 of a Scott-connected transformer indicated generally at 102. The centre tapped primary winding 103 of the transformer 102 is connected at one end to a three-phase supply line 104 while the other end of the primary winding 103 is connected through the contacts 105 of a normally open contactor to a second line 106 of the three-phase alternating current supply. The other primary winding 107 of the transformer 102 is connected at one end to the centre point of the winding 103 and is fed with current from the third line 108 of the three-phase alternating current supply through the operating coil 109 of a relay having contacts 110 which are normally open. A core balance transformer 111 is arranged to produce a voltage in its secondary winding 112 when substantial unbalance exists between the three-phase lines feeding the primary windings 103 and 107 of the transformer 102. The secondary winding 112 is connected to the operating winding 113 of a relay having normally closed switch contacts 114. The switch contacts 114 are connected in series with the contacts 110 of the relay responsive to the current in the line 108 and when both sets of contacts are closed the operating winding 115 of the contactor having contacts 105 in the three-phase line 106 is energised. In this condition the operating winding 115 is connected between the three-phase lines 106 and 108.

During welding, the currents in the three-phase lines 104, 106 and 108 substantially balance so that no voltage is induced in the secondary winding 112 of the current balance transformer 111. The operating winding 113 is, therefore, not energised so that the circuit through the switch contacts 110 and 114 is completed to energise the operating winding 115 of the contactor to keep the contacts 105 closed. If the main welding arcs between the electrodes and the work are broken, the currents in the three-phase lines 104, 106 and 108 no longer balance so that a voltage is induced in the winding 112 which energises the operating winding 113 and opens the contacts 114 thereby de-energising the operating winding 115 to open the contacts 105 through which one end of the primary winding 103 is fed from the line 106 of the three-phase supply. The disconnection of this end of the primary winding 103 causes a reduction in the interelectrode voltage sufficient to extinguish the inter-electrode arc. The flow of current in the operating winding 109 is not sufficient in this condition to keep the contacts 110 closed.

When it is desired to re-establish the welding condition one of the electrodes connected to the welding supply lines 51 or 52 is touched on the work connected to the line 19 so that current is drawn from the transformer thereby raising the single-phase current drawn between the lines 104 and 108 of the three-phase current supply above the low value which exists due to magnetising current when the arcs between the electrodes and the arcs between the electrodes and the work are extinguished. This increase in current through the operating winding 109 causes the contacts 110 (which had opened under the no load condition) to close. As equal and opposite currents flow in the lines 104 and 108 of the three-phase supply there is no unbalance in the current balance transformer 110 so that the contacts 114 are closed. Thus, the operating winding 115 of the contactor is energised causing the contacts 105 to close so that current is fed through the third phase line 106 to the primary winding 103 of the transformer 102. After a short transition period the currents in the current balance transformer 111 return to their balanced state so that the contactor contacts 105 are maintained closed during the welding operation. Provided the relay having the operating winding 113 is slugged the momentary unbalance in the core balanced transformer during the transition from the single-phase to the three-phase condition will not cause the contactor to open.

I claim:

1. Two-phase welding apparatus with which two electrodes are arranged to be used simultaneously and in close proximity, said electrodes and the work being arranged to be connected to two phases and the common return lead respectively of a two-phase welding current supply, comprising a Scott-connected transformer for providing said two-phase welding current supply from a three-phase supply, and means responsive to the current flowing in the common return lead to reduce the voltage between the electrodes to a value at which the interelectrode arc is extinguished by disconnecting one of the three-phase lines from the Scott-connected transformer.

2. Two-phase welding apparatus according to claim 1, wherein the means responsive to the current flowing in the common return lead includes a saturable current transformer.

3. Two-phase welding apparatus according to claim 1, wherein the means responsive to the current flowing in the common return lead comprises a current relay, and a contactor in one of the three-phase lines connected to one end of the center tapped winding of the Scott-connected transformer arranged to be controlled by said current relay.

4. Two-phase welding apparatus according to claim 1, having a voltage responsive relay connected between the common return lead of the welding current supply and one of the two-phase welding current supply leads, and a contactor in one of the three-phase lines to the Scott-connected transformer arranged to be operated by said voltage responsive relay when the voltage between said leads drops below a predetermined value.

5. Two-phase welding apparatus with which two electrodes are arranged to be used simultaneously and in close proximity, said electrodes and the work being arranged to be connected to two phases and the common return lead respectively of a two-phase welding current supply, comprising a Scott-connected transformer having secondary windings for providing said two-phase welding current supply from a three-phase supply connected to the primary windings of said transformer, means responsive to the current flowing in the common return lead including a saturable current transformer, having a primary winding connected in said common return lead and having a secondary winding, a current relay connected to said secondary winding, a contactor in one of the three-phase lines connected to one end of the center tapped primary winding of the Scott-connected transformer arranged to be energized through contacts of said current relay and arranged to be opened when the flow of current in said common return lead ceases, and a voltage responsive relay connected between the common return lead of the welding current supply and one of the two-phase welding current supply leads and having contacts arranged to effect the closing of said contactor when the voltage between said leads drops below a predetermined value.

6. Two-phase welding apparatus with which two electrodes are arranged to be used simultaneously and in close proximity, said electrodes and the work being arranged to be connected to two phases and the common return lead respectively of a two-phase welding current supply, comprising a Scott-connected transformer having primary windings for connection to a three-phase supply and secondary windings for providing said two-phase welding current supply, said secondary windings having tappings for the purpose of voltage adjustment, and means responsive to the current flowing in the common return lead to reduce the voltage between the electrodes to a value at which the inter-electrode arc is extinguished by disconnecting one of the three-phase lines of the Scott-connected transformer.

7. Two-phase welding apparatus with which two electrodes are arranged to be used simultaneously and in close proximity, said electrodes and the work being arranged to be connected to two phases and the common return lead respectively of a two-phase welding current supply, comprising a Scott-connected transformer having primary windings for connection to a three-phase supply and secondary windings for providing said two-phase welding current supply, said secondary windings having tappings for the purpose of voltage adjustment, at least one current regulating choke in the welding current supply having a portion arranged to be switched into and out of the circuit when the secondary voltage is changed by alteration of the tapping, and means responsive to the current flowing in the common return lead to reduce the voltage between the electrodes to a value at which the inter-electrode arc is extinguished by disconnecting one of the three-phase lines of the Scott-connected transformer.

8. Two-phase welding apparatus according to claim 7, wherein the means responsive to the current flowing in the common return lead comprises a current relay, and a contactor in one of the three-phase lines connected to one end of the center tapped primary winding of the Scott-connected transformer arranged to be controlled by said current relay.

9. Two-phase welding apparatus according to claim 8, having a voltage responsive relay connected between the common return lead of the welding current supply and one of the two-phase welding current supply leads and having contacts arranged to effect the closing of said contactor when the voltage between said leads drops below a predetermined value.

10. Two-phase welding apparatus according to claim 9, having means for rendering the contactor operating means ineffective when it is desired to perform single-phase welding with the apparatus.

IAN JACK PICKERING.

References Cited in the file of this patent
UNITED STATES PATENTS

| Number | Name | Date |
|---|---|---|
| 1,371,094 | Holslag | Mar. 8, 1921 |
| 1,610,920 | Bethenod | Dec. 14, 1926 |